(12) United States Patent
Taira

(10) Patent No.: US 10,539,452 B2
(45) Date of Patent: Jan. 21, 2020

(54) ROBOTIC WEIGHT MEASUREMENT AND SORTING SYSTEM

(71) Applicant: FANUC CORPORATION, Yamanashi (JP)

(72) Inventor: Yuuji Taira, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/983,211

(22) Filed: May 18, 2018

(65) Prior Publication Data

US 2018/0340819 A1 Nov. 29, 2018

(30) Foreign Application Priority Data

May 26, 2017 (JP) .................................. 2017-104897

(51) Int. Cl.
*G01G 19/18* (2006.01)
*B25J 15/06* (2006.01)
*B25J 19/02* (2006.01)

(52) U.S. Cl.
CPC .......... *G01G 19/18* (2013.01); *B25J 15/0616* (2013.01); *B25J 19/02* (2013.01); *Y10S 901/40* (2013.01); *Y10S 901/46* (2013.01)

(58) Field of Classification Search
CPC ..... G01G 19/18; G01G 19/52; B25J 15/0616; B25J 19/02; Y10S 901/40; Y10S 901/46
USPC .............................................................. 177/1
See application file for complete search history.

(56) References Cited

U.S. PATENT DOCUMENTS

| 4,417,630 A * | 11/1983 | Weber .................... B07C 5/20 177/1 |
| 2009/0216368 A1* | 8/2009 | Thorsson ............. G01G 19/303 700/219 |
| 2011/0166696 A1* | 7/2011 | Nignon .................... B07C 5/28 700/223 |
| 2012/0190981 A1* | 7/2012 | Harris .................... A61B 34/30 600/439 |
| 2013/0061695 A1 | 3/2013 | Sato |
| 2013/0345875 A1* | 12/2013 | Brooks ................. B25J 9/0087 700/259 |
| 2014/0230581 A1* | 8/2014 | Nakatani ................ G01L 5/009 73/865 |

(Continued)

FOREIGN PATENT DOCUMENTS

| CN | 102313591 A | 1/2012 |
| CN | 102990642 A | 3/2013 |

(Continued)

*Primary Examiner* — Natalie Huls
*Assistant Examiner* — Monica S Young
(74) *Attorney, Agent, or Firm* — Hauptman Ham, LLP

(57) ABSTRACT

A weight measurement system able to hold a plurality of articles and measure the respective weight thereof. A weight measurement system includes a robot arm, a weight measurement device attached to the robot arm, a plurality of hand movement mechanisms attached to the weight measurement device, and a plurality of hands separately moved by respective motions of the plurality of hand movement mechanisms, wherein the weight measurement device measures a weight of a first article held by a first of the hands moved by a motion of a first of the hand movement mechanisms and a weight of a second article held by a second of the hands moved by a motion of a second of the hand movement mechanisms.

7 Claims, 7 Drawing Sheets

(56) References Cited

U.S. PATENT DOCUMENTS

| | | | |
|---|---|---|---|
| 2014/0360306 A1* | 12/2014 | Mihara | B25J 9/0051 |
| | | | 74/490.02 |
| 2015/0314507 A1 | 11/2015 | Jang | |
| 2015/0343631 A1* | 12/2015 | Martinez-Esponda | ...................... |
| | | | B25J 9/0051 |
| | | | 74/490.03 |
| 2016/0199884 A1* | 7/2016 | Lykkegaard | B07C 5/02 |
| | | | 700/223 |
| 2018/0056335 A1* | 3/2018 | Ogusu | B07C 5/342 |
| 2019/0071195 A1* | 3/2019 | Hyodo | B25J 9/0093 |
| 2019/0111454 A1* | 4/2019 | Sezaki | B07C 3/08 |

FOREIGN PATENT DOCUMENTS

| | | |
|---|---|---|
| CN | 104880241 A | 9/2015 |
| JP | H0894424 A | 4/1996 |
| JP | 2002-210685 A | 7/2002 |
| JP | 2007-94864 A | 4/2007 |
| JP | 2013-3103 A | 1/2013 |
| JP | 2013-56402 A | 3/2013 |
| JP | 2016156707 A | 9/2016 |
| JP | 2017-19100 A | 1/2017 |

* cited by examiner

ROBOTIC WEIGHT MEASUREMENT AND SORTING SYSTEM

RELATED APPLICATIONS

The present application claims priority to Japanese Patent Application No. 2017-104897, filed on May 26, 2017, the disclosure of which is hereby incorporated by reference herein in its entirety.

BACKGROUND OF THE INVENTION

1. Field of the Invention

The invention relates to a weight measurement system for measuring a weight of an article and a method thereof.

2. Description of the Related Art

Weight measurement systems to hold and weigh an article are known (e.g., Japanese Unexamined Patent Publication (Kokai) No. 08-094424 and Japanese Unexamined Patent Publication (Kokai) No. 2016-156707).

In prior art, a technique for holding and weighing a plurality of articles is needed.

SUMMARY OF INVENTION

According to an aspect, a weight measurement system includes a robot arm, a weight measurement device attached to the robot arm, a plurality of hand movement mechanisms attached to the weight measurement device, and a plurality of hands respectively moved by respective motions of the plurality of hand movement mechanisms. The weight measurement device is configured to measure a weight of a first article held by a first hand moved by the motion of a first hand movement mechanism and a weight of a second article held by a second hand moved by the motion of a second hand movement mechanism.

In another aspect, a method of measuring a weight of an article by the above-mentioned weight measurement system includes operating the first hand movement mechanism to hold the first article by the first hand, measuring the weight of the first article held by the first hand, operating the second hand movement mechanism to hold the second article by the second hand while the first hand is holding the first article, measuring a total weight of the first article and the second article, and measuring the weight of the second article as a difference between the total weight and the weight of the first article.

According to an aspect of the present disclosure, it is possible to carry out sorting the articles more speedily when applied to an application that sorts the articles based on their weight.

BRIEF DESCRIPTION OF THE DRAWINGS

The object, features, and advantages of the present disclosure will be clearer by the description of embodiments below with reference to the attached drawings, in which.

DETAILED DESCRIPTION

Figure 1:
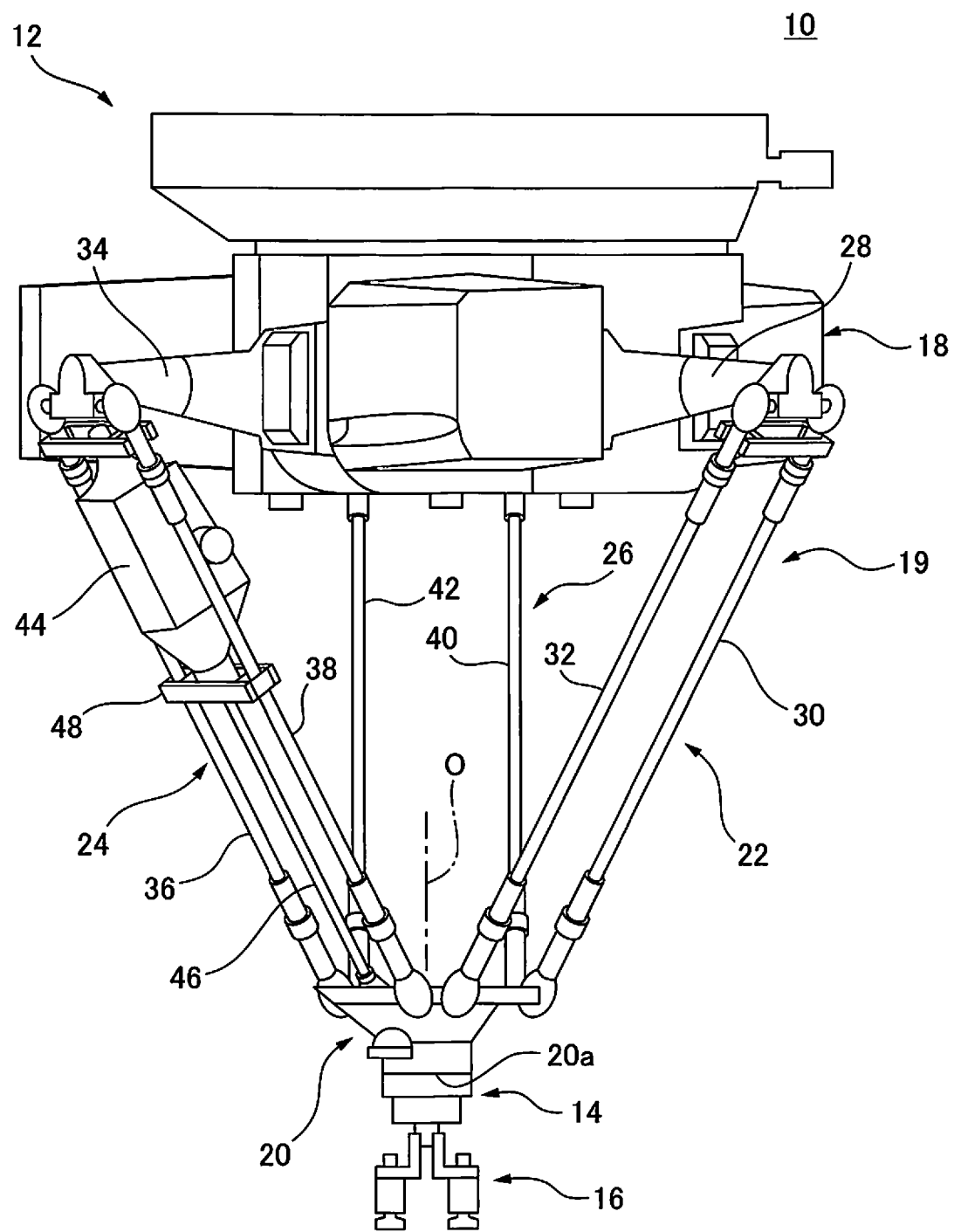
FIG. 1 illustrates a weight measurement system according to an embodiment.

Embodiments of the present disclosure will now be described in detail with reference to the drawings. Note that, in the various embodiments described below, similar elements are assigned the same reference numerals, and repetitive explanations thereof will be omitted. Further, in the description below, the leftward, rightward, upward and downward in the drawings are respectively referred to as the leftward, rightward, upward and downward, for the sake of convenience.

With reference to FIGS. 1 to 4, a weight measurement system 10 according to an embodiment will be described. The weight measurement system 10 is a system for holding articles $A_1$ and $A_2$ (FIG. 3, FIG. 4) describe later and measuring the weights of the articles $A_1$ and $A_2$.

As illustrated in FIG. 1, the weight measurement system 10 includes a robot 12, a weight measurement device 14, and an end effector 16. In this embodiment, the robot 12 is a parallel link robot. Specifically, the robot 12 includes a base 18 and a robot arm 19.

The robot arm 19 includes a movable section 20, a first link mechanism 22, a second link mechanism 24, and a third link mechanism 26. The movable section 20 is movably supported by the base 18 via the first link mechanism 22, the second link mechanism 24, and the third link mechanism 26. In this embodiment, the movable section 20 is a substantially truncated-cone shaped 20' member having a central axis O.

The first link mechanism 22 includes a first drive link 28 and a pair of driven links 30 and 32. The first drive link 28 is rotatably coupled to the base 18. A proximal end of each of the pair of driven links 30 and 32 is rotatably coupled to a distal end of the first drive link 28, while a distal end of each of the pair of driven links 30 and 32 is rotatably coupled to the movable section 20.

The second link mechanism 24 has a similar configuration as the first link mechanism 22. Specifically, the second link mechanism 24 includes a second drive link 34 rotatably coupled to the base 18 and a pair of driven links 36 and 38. A proximal end of each of the pair of driven links 36 and 38 is rotatably coupled to a distal end of the second drive link 34, while a distal end of each of the pair of driven links 36 and 38 is rotatably coupled to the movable section 20.

The third link mechanism 26 has a similar configuration as the first link mechanism 22. Specifically, the third link mechanism 26 includes a third drive link (not illustrated) rotatably coupled to the base 18 and a pair of driven links 40 and 42. A proximal end of each of the pair of driven links 40 and 42 is rotatably coupled to a distal end of the third drive link, while a distal end of each of the pair of driven links 40 and 42 is rotatably coupled to the movable section 20.

The robot arm 19 further includes a first link driver (not illustrated) configured to rotate the first drive link 28, a second link driver (not illustrated) configured to rotate the second drive link 34, and a third link driver (not illustrated) configured to rotate the third drive link.

The first link driver, the second link driver, and the third link driver respectively rotate the first drive link 28, the second drive link 34, and the third drive link individually, thereby moving the movable section 20 in three axis-directions of a Cartesian coordinate system.

The robot arm 19 further includes an auxiliary driver 44 and an auxiliary shaft 46. In this embodiment, the auxiliary driver 44 is disposed between the driven links 36 and 38. A proximal end of the auxiliary driver 44 is coupled to the second drive link 34, while a distal end of the auxiliary driver 44 is slidably coupled with the driven links 36 and 38 via an attachment member 48.

A proximal end of the auxiliary shaft 46 is coupled with the auxiliary driver 44, while a distal end of the auxiliary shaft 46 is rotatably coupled to the movable section 20. The auxiliary shaft 46 extends between the auxiliary driver 44 and the movable section 20 so as to be parallel to the driven links 36 and 38.

The auxiliary driver 44 advances and retracts the auxiliary shaft 46 along the extension direction of the driven links 36 and 38. The auxiliary driver 44 changes the orientation of the movable section 20 by advancing and retracting the auxiliary shaft 46.

Figure 2:
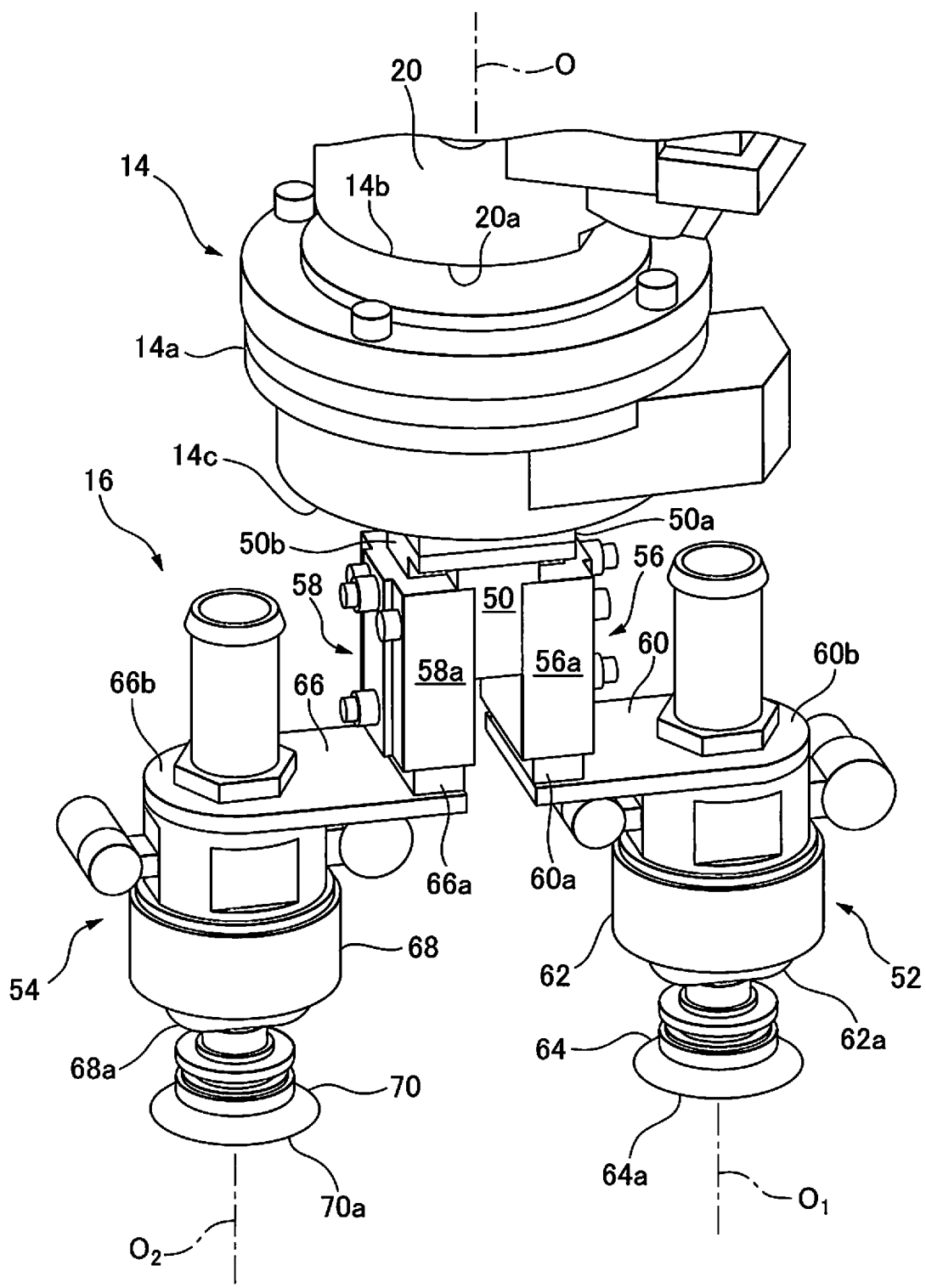
FIG. 2 is an enlarged perspective view of the weight measurement device and the end effector illustrated in FIG. 1.

The weight measurement device 14 is attached to a distal end 20a of the movable section 20. As illustrated in FIG. 2, the weight measurement device 14 includes a substantially circular columnar-shaped housing 14a and a sensor element (not illustrated) housed in the housing 14a.

A proximal end 14b of the housing 14a is fixed to the distal end 20a of the movable section 20. In this embodiment, the weight measurement device 14 (Specifically, the housing 14a) is disposed concentrically with the movable section 20 such that the central axis of the weight measurement device 14 substantially coincides with the central axis O of the movable section 20.

The sensor element is e.g. a strain gauge or a load sensor, and detects a force applied to the weight measurement device 14 due to the weights of the end effector 16 and the articles $A_1$, $A_2$ (FIG. 3, FIG. 4) held by the end effector 16. The weight measurement system 10 can measure the weights of the articles $A_1$, $A_2$ (FIG. 3, FIG. 4) held by the end effector 16 by eliminating the component due to the weight of the end effector 16 from the value detected by the sensor element.

The end effector 16 includes a base 50, a first hand 52, a second hand 54, a first hand movement mechanism 56, and a second hand movement mechanism 58. In this embodiment, the base 50 is fixed to a distal end 14c of the weight measurement device 14 (Specifically, the housing 14a).

According to this embodiment, the base 50 is a substantially rectangular-parallelepiped member, and disposed concentrically with the movable section 20 and weight measurement device 14 such that the central axis of the base 50 substantially coincides with the central axis O of the movable section 20 and the weight measurement device 14.

Figure 3:
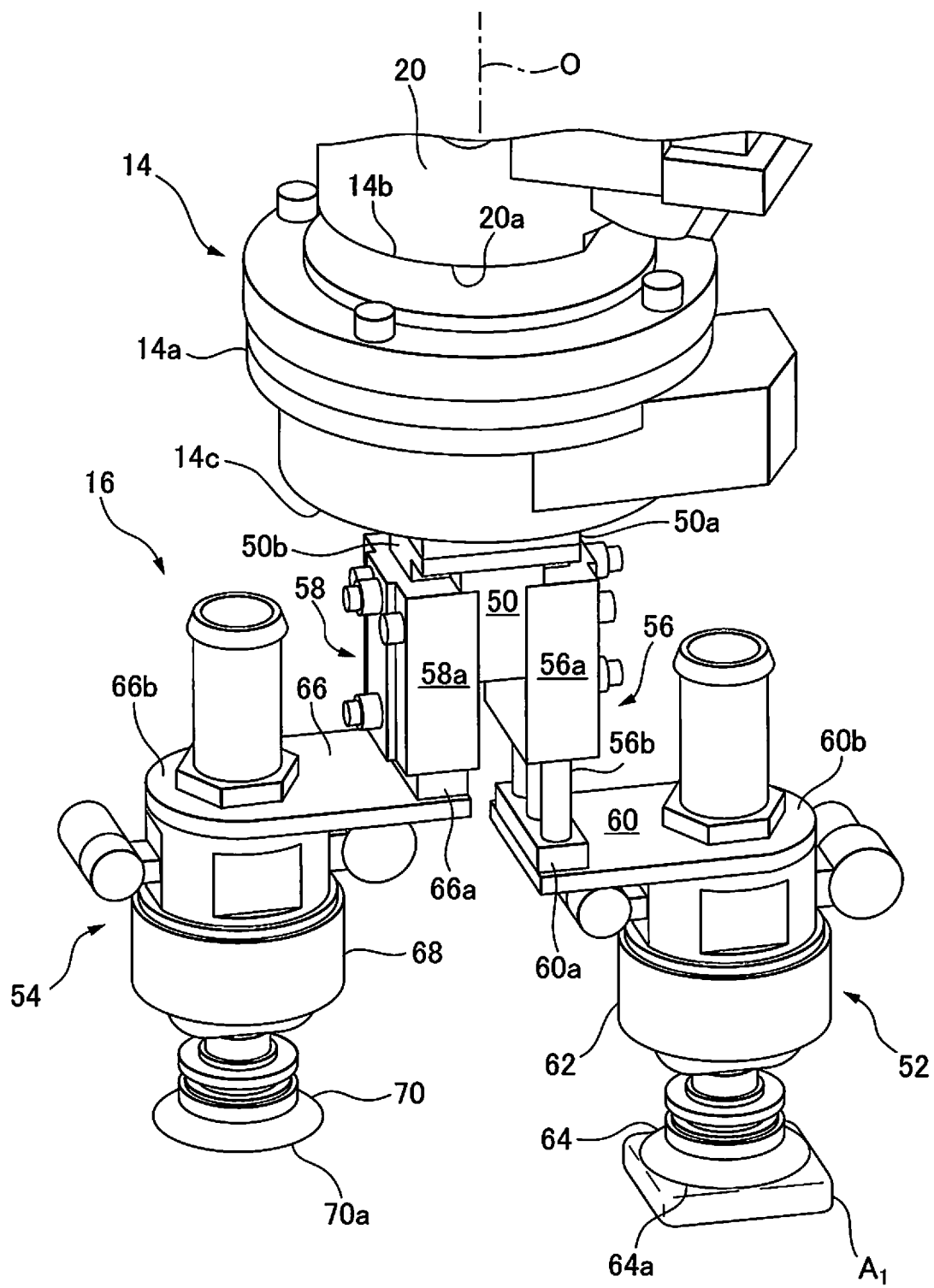
FIG. 3 shows a state where the first hand holds the first article in the end effector illustrated FIG. 2.

The first hand movement mechanism 56 is disposed between the weight measurement device 14 and the first hand 52, and attached to the distal end 14c of the weight measurement device 14 via the base 50. In this embodiment, the first hand movement mechanism 56 is an air cylinder and includes a cylinder body 56a and a cylinder shaft 56b (FIG. 3).

The cylinder body 56a is hollow and fixed on a right side 50a of the base 50. The cylinder shaft 56b is housed in the cylinder body 56a so as to be able to advance and retract, and extends downward from the cylinder body 56a along the axis O.

The cylinder body 56a is connected to an air supply device (not illustrated) provided outside the weight measurement system 10, wherein the air supply device increases and decreases the pressure in the cylinder body 56a. The cylinder shaft 56b is advanced and retracted along the axis O in response to the pressure in the cylinder body 56a.

Specifically, when the pressure in the cylinder body 56a is "low", the cylinder shaft 56b is arranged at the retracted position illustrated in FIG. 2, thereby the first hand 52 is also arranged at the retracted position.

When the pressure in the cylinder body 56a is changed from the state shown in FIG. 2 to "high" by the air supply device, the cylinder shaft 56b is pushed downward and arranged at the advanced position illustrated in FIG. 3. Thereby, the first hand 52 is also arranged at the advanced position. The advanced position is a position separate away from the base 50 than the retracted position. In this way, the first hand movement mechanism 56 advances and retracts the first hand 52 along the axis O.

The second hand movement mechanism 58 is disposed between the weight measurement device 14 and the second hand 54, and attached to the distal end 14c of the weight measurement device 14 via the base 50. The second hand movement mechanism 58 has a similar configuration as the first hand movement mechanism 56, and disposed to be symmetrical to the first hand movement mechanism 56 with respect to the axis O.

Specifically, the second hand movement mechanism 58 is an air cylinder, and includes a hollow cylinder body 58a fixed on a left side 50b of the base 50, and a cylinder shaft 58b (FIG. 4) housed in the cylinder body 58a so as to be able to advance and retract and extending along the axis O.

The cylinder body 58a is connected to the air supply device (not illustrated) provided outside, wherein the air supply device increases and decreases the pressure in the cylinder body 58a. When the pressure in the cylinder body 58a is "low", the cylinder shaft 58b is arranged at the retracted position illustrated in FIG. 2, thereby the second hand 54 is also arranged at the retracted position.

Figure 4:
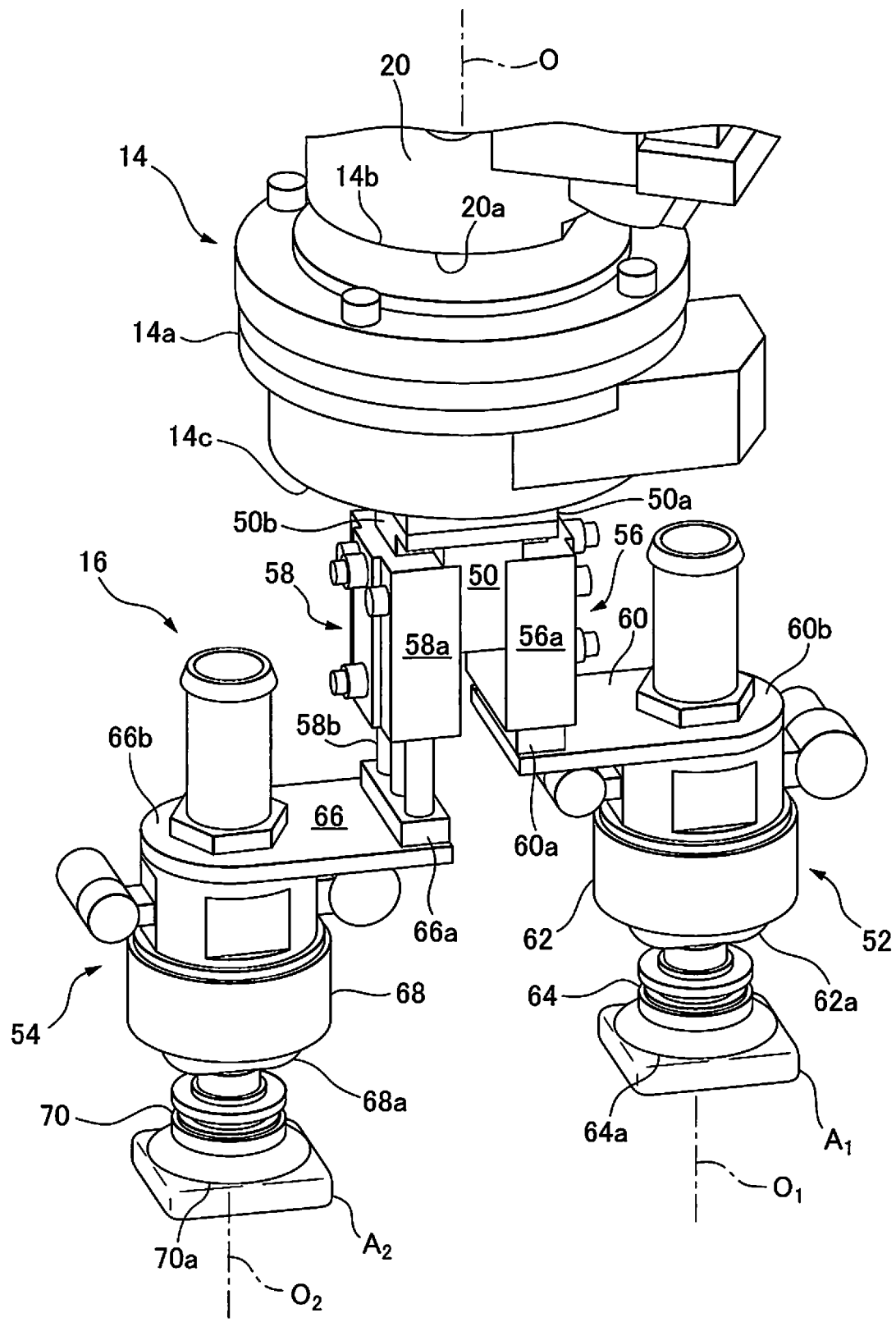
FIG. 4 shows a state where the first and second hands respectively hold the first and a second articles in the end effector illustrated FIG. 2.

When the pressure in the cylinder body 58a is changed from the state illustrated in FIG. 2 to "high" by the air supply device, the cylinder shaft 58b is pushed downward and arranged at the advanced position illustrated in FIG. 4. Thereby, the second hand 54 is also arranged at the advanced position. In this way, the second hand movement mechanism 58 advances and retracts the second hand 54 along the axis O.

The first hand 52 is fixed to a distal end of the cylinder shaft 56b of the first hand movement mechanism 56. The first hand 52 includes a bracket 60, a negative-pressure generation device 62, and a suction section 64.

The bracket 60 is a flat plate member, and a left end 60a thereof is fixed to the distal end of the cylinder shaft 56b. The bracket 60 is disposed so as to extend rightward from the cylinder shaft 56b.

The negative-pressure generation device 62 is cylindrical and fixed to a right end 60b of the bracket 60 so as to protrude downward from the bracket 60. The suction section 64 is a ring-shaped member and fixed to a distal end 62a of the negative-pressure generation device 62.

In this embodiment, the negative-pressure generation device 62 and the suction section 64 have a common central axis $O_1$ and are arranged concentrically to each other. The axis $O_1$ is substantially parallel to the axis O, and separate rightward from the axis O.

The inside of the suction section 64 is in fluid communication with the inside of the negative-pressure generation device 62. The suction section 64 has a suction surface 64a at its distal end. At least one air hole (not illustrated) is formed at the suction surface 64a.

The negative-pressure generation device 62 is connected to the air supply device (not illustrated) provided outside. When the air supply device supplies an air into the negative-pressure generation device 62 so as to set the pressure in the negative-pressure generation device 62 to "high", the negative-pressure generation device 62 generates a negative pressure in the suction section 64.

Due to this, an air flow into the suction section 64 through the air hole formed at the suction surface 64a is generated, thereby the suction surface 64a can suck a first article $A_1$ as illustrated in FIG. 3. In this way, the first hand 52 can hold the first article $A_1$.

The second hand 54 has a similar configuration as the first hand 52, and is disposed to be symmetrical to the first hand 52 with respect to the axis O. Specifically, the second hand 54 is fixed to a distal end of the cylinder shaft 58b of the second hand movement mechanism 58, and includes a bracket 66, a negative-pressure generation device 68, and a suction section 70.

The bracket 66 is a flat plate member, and a right end 66a thereof is fixed to the distal end of the cylinder shaft 58b. The bracket 66 is disposed so as to extend leftward from the cylinder shaft 58b.

The negative-pressure generation device 68 is cylindrical and fixed to a left end 66b of the bracket 66 so as to protrude downward from the bracket 66. The suction section 70 is a ring shaped member and fixed to a distal end 68a of the negative-pressure generation device 68.

In this embodiment, the negative-pressure generation device 68 and the suction section 70 have a common central axis $O_2$ and are arranged concentrically to each other. The axis $O_2$ is substantially parallel to the axis O and separate leftward from the axis O.

The inside of the suction section 70 is in fluid communication with the inside of the negative-pressure generation device 68. The suction section 70 has a suction surface 70a at its distal end. At least one air hole (not illustrated) is formed at the suction surface 70a.

The negative-pressure generation device 68 is connected to the air supply device (not illustrated). When the air supply device supplies an air into the negative-pressure generation device 68 so as to set the pressure in the negative-pressure generation device 68 to "high", the negative-pressure generation device 68 generates a negative pressure in the suction section 70.

Thereby, an air flow into the suction section 70 through the air hole formed at the suction surface 70a is generated, by which, the suction surface 70a can suck a second article $A_2$ as illustrated in FIG. 4. In this way, the second hand 54 can hold the second article $A_2$. For example, the first article $A_1$ and the second article $A_2$ are food products (e.g., confectionary) or IC chips.

The weight measurement device 14 measures the weight $W_1$ of the first article $A_1$ held by the first hand 52 moved by the motion of the first hand movement mechanism 56, and the weight $W_2$ of the second article $A_2$ held by the second hand 54 moved by the motion of the second hand movement mechanism 58. The weight measurement system 10 is configured to measure each of the weights $W_1$ and $W_2$.

In an example, the weight measurement system 10 holds the first article $A_1$ by the first hand 52 as illustrated in FIG. 3, and measures the weight $W_1$ of the first article $A_1$ by the weight measurement device 14, at first. Then, the weight measurement system 10 holds the second article $A_2$ by the second hand 54 while holding the first article $A_1$ with the first hand 52 as illustrated in FIG. 4, and measures the total weight $W_S (=W_1+W_2)$ of the weight $W_1$ of the first article $A_1$ and the weight $W_2$ of the second article $A_2$, by the weight measurement device 14.

Then, the weight measurement system 10 calculates the weight $W_2$ of the second article $A_2$ by subtracting the weight $W_1$ of the first article $A_1$ from the total weight $W_S$. In this way, the weight measurement system 10 can measure each of the weight $W_1$ and the weight $W_2$.

As another example, the weight measurement system 10 respectively holds the first article $A_1$ and the second article $A_2$ by the first hand 52 and the second hand 54 as illustrated in FIG. 4, and measures the total weight $W_S$ of the weight $W_1$ of the first article $A_1$ and the weight $W_2$ of the second article $A_2$ with the weight measurement device 14.

Then, the weight measurement system 10 releases the second article $A_2$ from the second hand 54 and measures the weight $W_1$ of the first article $A_1$ by the weight measurement device 14. Then, the weight measurement system 10 calculates the weight $W_2$ of the second article $A_2$ by subtracting the weight $W_1$ of the first article $A_1$ from the total weight $W_S$. In this way, the weight measurement system 10 can measure each of the weight $W_1$ and the weight $W_2$.

As described above, according to this embodiment, the weight measurement system 10 can holds the plurality of articles $A_1$ and $A_2$ by the plurality of hands 52 and 54, and measure the respective weights $W_1$ and $W_2$ of the plurality of articles $A_1$ and $A_2$.

According to this configuration, it is possible to carry out sorting of the articles more speedily, in a case where the weight measurement system 10 is applied to an application for sorting articles $A_1$ and $A_2$ based on their weights $W_1$ and $W_2$, for example.

In this embodiment, the end effector 16 includes a total of two hands 52 and 54 and a total of two hand movement mechanisms 56 and 58. However, the end effector 16 may include a total of "n" hands and a total of "n" hand movement mechanisms ("n" is an integer greater than 2). The $n_{th}$ hand movement mechanism moves the $n_{th}$ hand, wherein the $n_{th}$ hand holds the $n_{th}$ article $A_n$.

For example, the end effector 16 illustrated in FIG. 2 may further include a third hand movement mechanism fixed to the front side (i.e., the side in the frontward of FIG. 2) of the base 50, a third hand moved by a motion of the third hand movement mechanism, a fourth hand movement mechanism fixed to the back side (i.e., the side in the rearward of FIG. 2) of the base 50, and a fourth hand moved by a motion of the fourth hand movement mechanism.

In this case, the third hand movement mechanism and the fourth hand movement mechanism may have configurations similar as the above-described hand movement mechanisms 56 and 58. Further, the third and fourth hands may have configurations similar as the above-described hands 52 and 54.

Figure 5:
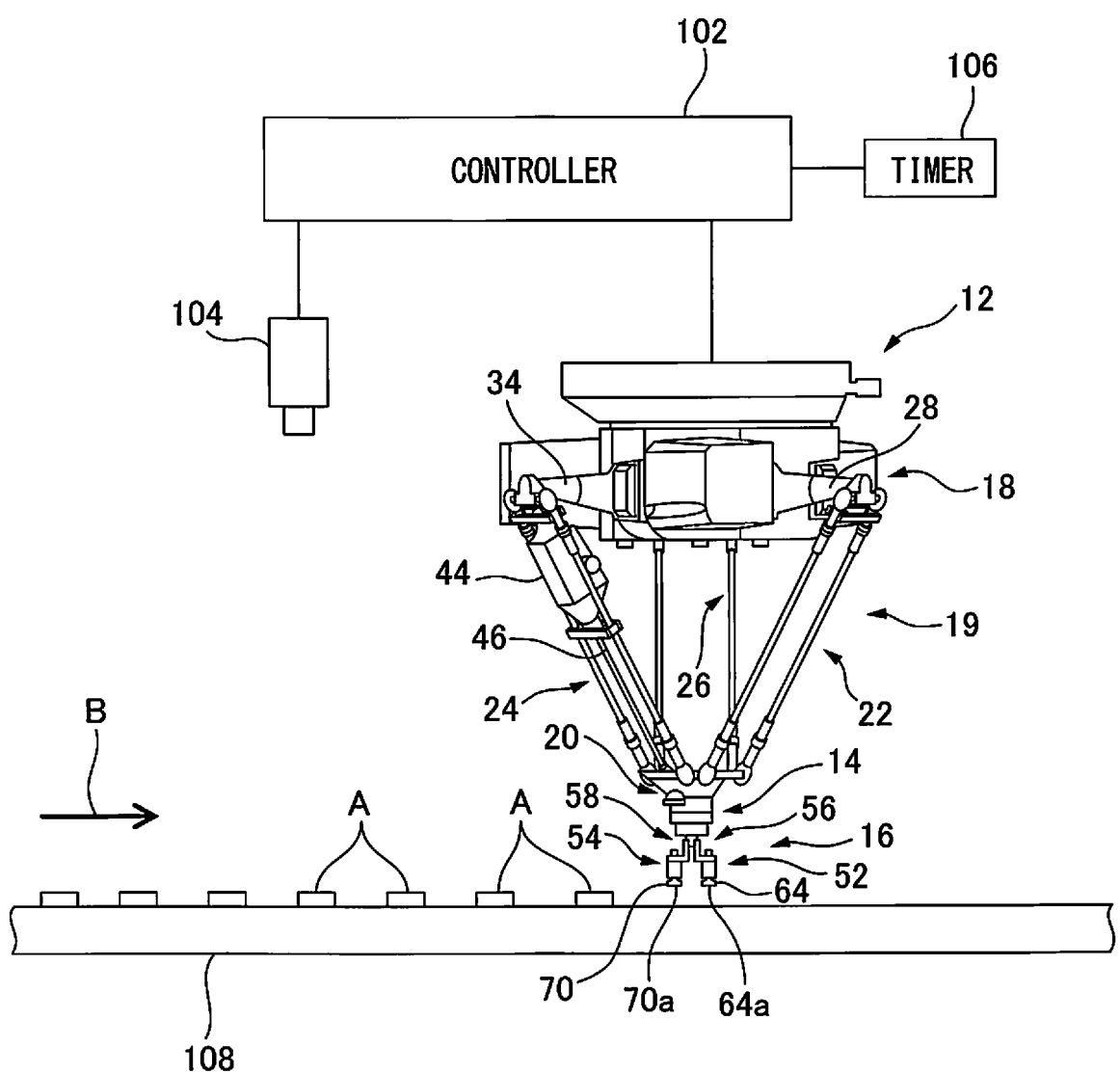
FIG. 5 illustrates a weight measurement system according to another embodiment.

Next, with reference to FIG. 5, a weight measurement system 100 according to another embodiment will be described. The weight measurement system 100 is for holding and weighing articles A conveyed by a conveyer 108.

The weight measurement system 100 includes a controller 102, a vision sensor 104, a timer 106, the robot 12, the weight measurement device 14, and the end effector 16. The controller 102 includes a CPU and memory (not illustrated), and controls the vision sensor 104, the robot 12, the weight measurement device 14, and the end effector 16, directly or indirectly.

The vision sensor 104 is e.g. a three-dimension vision sensor, and disposed vertically upward of the conveyer 108. The vision sensor 104 images the articles A conveyed by the conveyer 108, and transmits the captured images of the articles A to the controller 102.

The controller 102 acquires the position and orientation of each article A on the conveyer 108, based on the image of the article A received from the vision sensor 104. The timer 106 measures the elapsed time t from a predetermined time point, in accordance with a command from the controller 102.

Figure 6:
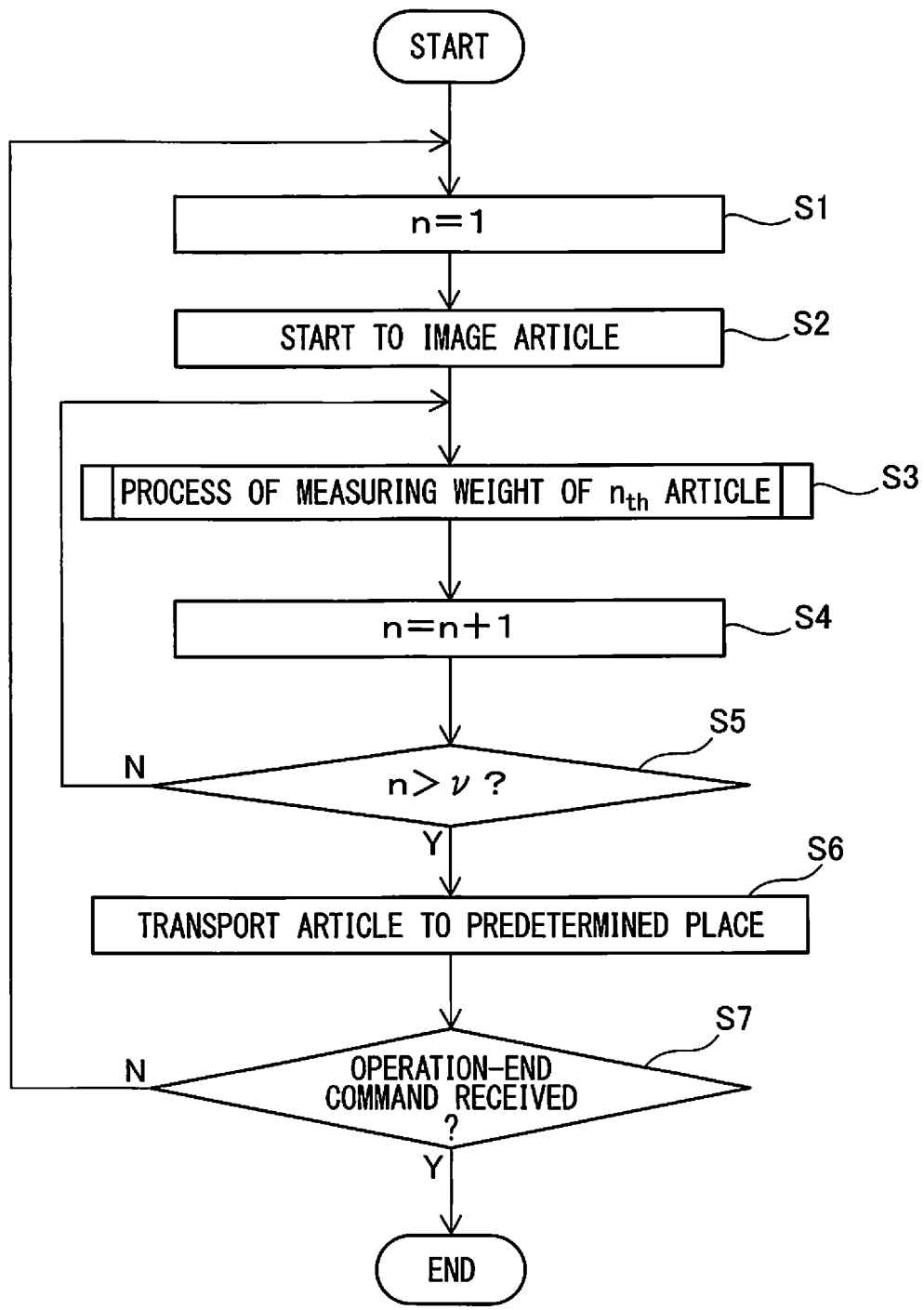
FIG. 6 is a flow chart illustrating an example of an operation process of the weight measurement system illustrated in FIG. 5.

Next, with reference to FIG. 6, an operation of the weight measurement system 100 will be described. The flow illustrated in FIG. 6 is started when the controller 102 has received an operation-start command from a user or host controller.

For example, the user or host controller transmits the operation-start command to the controller 102 when the conveyer 108 has been activated. After the conveyer 108 has been activated, the articles A are successively placed on the upstream end of the conveyer 108.

In step S1, the controller 102 set the number "n" for identifying the $n_{th}$ hand movement mechanism and the $n_{th}$ hand to "1". According to this embodiment, n=1, 2.

In step S2, the controller 102 starts to image articles A by the vision sensor 104. Specifically, the controller 102 sends an imaging-start command to the vision sensor 104. Upon receipt of the imaging-start command, the vision sensor 104 images the articles A conveyed by the conveyer 108, successively (e.g., at a period τ), and sequentially transmits the captured images of the articles A to the controller 102. The controller 102 acquires the position and orientation of each article A based on the image received from the vision sensor 104.

In step S3, the controller 102 executes the process of measuring the weight of the $n_{th}$ article $A_n$. This step S3 will be described below with reference to FIG. 7.

In step S11, the controller 102 positions the $n_{th}$ hand with respect to an $n_{th}$ article $A_n$ of the articles A on the conveyer 108. Specifically, the controller 102 controls the robot 12 based on the position and orientation of the $n_{th}$ article $A_n$ among the articles A on the conveyer 108, which have been acquired in step S2, so as to move the movable section 20 such that the suction section (64 or 70) of the $n_{th}$ hand (52 or 54) can track the $n_{th}$ article $A_n$ at a position upward of the $n_{th}$ article $A_n$.

If the number "n" is set as the number "n" is set as n=1 at this moment, the controller 102 controls the robot 12 based on the position and orientation of the first article $A_1$ on the conveyer 108 so as to move the movable section 20 such that the suction section 64 of the first hand 52 can track the first article $A_1$.

In step S12, the controller 102 operates the $n_{th}$ hand movement mechanism (56 or 58) so as to move the $n_{th}$ hand (52 or 54) to the advanced position. Specifically, the controller 102 sends a command to the air supply device so as to change the pressure in the cylinder body (56a or 58a) of the $n_{th}$ hand movement mechanism from "low" to "high".

Thereby, the $n_{th}$ hand movement mechanism moves the $n_{th}$ hand from the retracted position to the advanced position. If the number "n" is set as the number "n" is set as n=1 at this moment, the controller 102 operates the first hand movement mechanism 56 so as to move the first hand 52 to the advanced position.

When this step S12 is executed, the robot 12 positions the movable section 20 with respect to the $n_{th}$ article $A_n$ such that the suction surface of the $n_{th}$ hand lightly touch the upper surface of the $n_{th}$ article $A_n$ or is disposed adjacent to upside of the $n_{th}$ article $A_n$.

In step S13, the controller 102 causes the $n_{th}$ hand to hold the $n_{th}$ article $A_n$. Specifically, the controller 102 sends a command to the air supply device so as to supply an air to the negative-pressure generation device (62 or 68) of the $n_{th}$ hand (52 or 54).

Thereby, the negative-pressure generation device of the $n_{th}$ hand generates a negative pressure in the suction section (64 or 70), as a result of which, the $n_{th}$ article $A_n$ is sucked onto the suction surface (64a or 70a). If the number "n" is set as the number "n" is set as n=1 at this moment, the controller 102 activates the negative-pressure generation device 62 of the first hand 52 so as to cause the suction section 64 to suck the first article $A_1$.

In step S14, the controller 102 determines whether or not the $n_{th}$ hand has properly held the $n_{th}$ article $A_n$. As an example, the controller 102 monitors the pressure in the negative-pressure generation device (62, 68) of the $n_{th}$ hand (52, 54), and determines that the $n_{th}$ article $A_n$ is properly sucked and held by the suction surface (64a, 70a) of the $n_{th}$ hand (52, 54) when the monitored pressure has changed beyond a predetermined threshold value.

As another example, the controller 102 monitors the weight detected by the weight measurement device 14, and determines that the $n_{th}$ article $A_n$ is properly sucked and held by the suction surface (64a, 70a) of the $n_{th}$ hand (52, 54) when the monitored weight has increased beyond a predetermined threshold value.

The controller 102 proceeds to step S15 when it has determined that the $n_{th}$ hand properly holds the $n_{th}$ article $A_n$ (i.e., determines YES). On the other hand, the controller 102 loops step S14 when it has determined that the $n_{th}$ hand does not properly hold the $n_{th}$ article $A_n$ (i.e., determines NO).

In step S15, the controller 102 operates the $n_{th}$ hand movement mechanism so as to move the $n_{th}$ hand to the retracted position. Specifically, the controller 102 sends a command to the air supply device so as to change the pressure in the cylinder body (56a or 58a) of the $n_{th}$ hand movement mechanism (56 or 58) from "high" to "low". The $n_{th}$ hand movement mechanism thereby moves the $n_{th}$ hand (52 or 54) from the advanced position to the retracted position.

If the number "n" is set as n=1 at this moment, the controller 102 operates the first hand movement mechanism 56 so as to move the first hand 52 to the retracted position. As a result, the first hand 52 holds the first article $A_1$ at a position separate upward from the conveyer 108.

On the other hand, if the number "n" is set as n=2 at this moment (i.e., if step S3 is executed for the second time), the controller 102 operates the second hand movement mechanism 58 so as to move the second hand 54 to the retracted position. As a result, the second hand 54 holds the second article $A_2$ in a position separate upward from the conveyer 108 while the first hand 52 holds the first article $A_1$.

In step S16, the controller 102 starts to measure the elapsed time t by the timer 106. Specifically, the controller 102 sends a timing command to the timer 106. The timer 106 measures the elapsed time t from the time point when it has received the timing command from the controller 102.

As an example, the controller 102 determines in step S15 whether or not the motion of the $n_{th}$ hand movement mechanism (56, 58) has been completed, and sends the timing command to the timer 106 when determining that the motion of the $n_{th}$ hand movement mechanism has been completed.

In this case, the $n_{th}$ hand movement mechanism may include a proximity sensor (not illustrated) provided at the proximal end (corresponding to the retracted position) of the movement stroke of the cylinder shaft (56b, 58b), wherein the proximity sensor may detect that the cylinder shaft (56b, 58b) is moved to the retracted position. When the proximity sensor detects that the cylinder shaft (56b, 58b) is moved to the retracted position, the controller 102 determines that the motion of the $n_{th}$ hand movement mechanism has been completed and sends the timing command to the timer 106.

As another example, the controller 102 may send the timing command to the timer 106 when a predetermined time has elapsed from the time point at the start of step S15 (Specifically, the time point when the controller 102 has sent the command to the air supply device in step S15). This predetermined time can be defined enough to make the operation of the $n_{th}$ hand movement mechanism be completed in step S15.

In step S17, the controller 102 determines whether or not a predetermined time has elapsed from the time point at the start of step S16. Specifically, the controller 102 determines whether or not the elapsed time t measured by the timer 106 has reached a predetermined time $t_R$. The time $t_R$ is predetermined by the user and stored in the memory of the controller 102.

When the controller 102 determines that the elapsed time t measured by the timer 106 has reached the time $t_R$ (i.e., determines YES), it proceeds to the step S18. On the other hand, when the controller 102 determines that the elapsed time t measured by the timer 106 has not reached the time $t_R$ (i.e., determines NO), it loops step S17.

When it is determined YES in this step S17, the movement of the $n_{th}$ hand (52 or 54) is completely ended, thereby the $n_{th}$ hand is in a static state. In other words, the above time $t_R$ can be set enough to make the $n_{th}$ hand be static after the execution of step S15.

In step S18, the controller 102 measures the weight W of the article A held by the end effector 16. Specifically, the controller 102 sends a command to the weight measurement device 14, and the weight measurement device 14 measures the weight W of the article A held by the end effector 16.

If step S18 is executed when the number "n" is set as n=1, the end effector 16 holds only the first article $A_1$ as illustrated in FIG. 3, and therefore the weight W measured by the weight measurement device 14 in this step S18 is the weight $W_1$ of the article $A_1$.

On the other hand, if step S18 is executed when the number "n" is set as n=2, the end effector 16 holds the article $A_1$ and $A_2$ as illustrated in FIG. 4. Therefore, the weight W measured by the weight measurement device 14 in this step S18 is the total weight $W_S$ of the weight $W_1$ of the first article $A_1$ and the weight $W_2$ of the second article $A_2$. The weight $W_S$ is expressed by Equation 1 below.

$$W_S = \sum_{i=1}^{n} Wi \qquad \text{Equation 1}$$

In step S19, the controller 102 determines whether or not the number "n" is set to "1". The controller 102 proceeds to step S20 when it determines that n=1 (i.e., determines YES). On the other hand, the controller 102 proceeds to step S23 when it determines that the number "n" is set to a value other than "1" (i.e., determines NO).

In step S20, the controller 102 measures the weight $W_1$ of the first article $A_1$. Specifically, the controller 102 acquires the weight W measured at the most-recent step S18 as the weight $W_1$ of the first article $A_1$.

When it is determined NO in step S19, in step S23, the controller 102 measures the total weight $W_S$ of the weights W of the articles A held by the end effector 16. Specifically, the controller 102 acquires the weight W measured at the most-recent step S18 as the total weight $W_S$.

In step S24, the controller 102 measures the weight $W_n$ of the $n_{th}$ article $A_n$. Specifically, the controller 102 measures the weight $W_n$ of the $n_{th}$ article $A_n$ by subtracting the sum weight $W_{S-1}$ of the articles $A_1$ to $A_{n-1}$ acquired by this moment from the total weight $W_S$ calculated at the most-recent step S23. The sum weight $W_{S-1}$ is expressed by Equation 2 below.

$$W_{S\_1} = \sum_{i=1}^{n-1} Wi \qquad \text{Equation 2}$$

If the number "n" is set as n=2 at this moment, the controller 102 measures the weight $W_2$ of the second article $A_2$ by subtracting the weight $W_1$ of the first article $A_1$ measured in step S20 from the total weight $W_S$ (=$W_1$+$W_2$) measured in step S23. Thus, according to this embodiment, the controller 102 measures the weight $W_2$ of the second article $A_2$ as the difference (=$W_S$−$W_1$) between the total weight $W_S$ and the weight $W_1$ of the first article $A_1$.

In step S21, the controller 102 determines whether or not the weight $W_n$ acquired in step S20 or S24 is within a predetermined allowance range [α, β]. The allowance range [α, β] is predetermined by the user and stored in the memory of the controller 102. When the weight $W_n$ is within the allowance range (i.e., α≤$W_n$≤β), the controller 102 determines YES, and proceeds to step S4 in FIG. 6.

On the other hand, when the weight $W_n$ is out of the allowance range (i.e., $W_n$<α, or β<$W_n$), the controller 102 determines NO, and proceeds to step S22. The allowance range [α, β] is for defining an appropriate weight of the article A, and the article A having a weight out of the allowance range is sorted as a defective product (step S22 described below).

In step S22, the controller 102 transports the $n_{th}$ article $A_n$, for which it is determined NO in step S21, to a predetermined defective product storage. This defective product storage is for storing the articles A that are defective.

The controller 102 operates the robot 12 so as to transport the $n_{th}$ article $A_n$, for which it is determined NO in step S21, to a position above the defective product storage. Then, the controller 102 sends a command to the air supply device so as to remove the air from the negative-pressure generation device (62, 68) of the $n_{th}$ hand (52, 54). Due to this, the negative pressure generated by the negative-pressure generation device (62, 68) is eliminated, thereby the $n_{th}$ article $A_n$ is released from the suction surface (64a, 70a) and placed in the defective product storage.

With reference to FIG. 6 again, in step S4, the controller 102 increments the number "n" by one (i.e., n=n+1). If the number "n" is set as n=1 at this moment, the controller 102 increments the number "n" from "1" to "2".

In step S5, the controller 102 determines whether or not the number "n" is a value larger than γ. The value γ is set to be equal to the number of hands 52, 54 (i.e., the number of hand movement mechanisms 56, 58). In this embodiment, since the number of the hands 52, 54 (or the hand movement mechanisms 56, 58) is "2", the value γ is set as γ=2.

When the controller 102 determines that n>γ (i.e., determines YES), it proceeds to step S6. On the other hand, when the controller 102 determines that n≤γ (i.e., determines NO), it returns to step S3. In this way, the controller 102 carries out the loop of steps S3 to S5 until it determines YES in step S5.

In step S6, the controller 102 transports the articles A (i.e., the articles $A_1$ and $A_2$) held by the end effector 16 to a predetermined acceptable product storage. This acceptable product storage is for storing acceptable articles A.

The controller 102 operates the robot 12 so as to transport the articles $A_1$ and $A_2$ held by the end effector 16 to a position above the acceptable product storage. Then, the controller 102 sends a command to the air supply device so as to remove the air from the negative-pressure generation devices 62 and 68 of all the hands 52 and 54. Due to this, the negative pressure generated by the negative-pressure generation devices 62 and 68 is eliminated, thereby the articles $A_1$ and $A_2$ are released from the suction surfaces 64a and 70a and placed in the acceptable product storage.

In step S7, the controller 102 determines whether or not it has received an operation-end command from the user or host controller. When the controller 102 determines that it has received the operation-end command (i.e., determines YES), it ends the flow illustrated in FIG. 6. On the other hand, when the controller 102 determines that it has not received the operation-end command (i.e., determines NO), it returns to step S1.

As described above, in this embodiment, the controller 102 can cause the end effector 16 to hold a plurality of articles $A_1$ and $A_2$ (step S13), and measure the respective weights $W_1$ and $W_2$ of the articles $A_1$ and $A_2$ (steps 20, 24). According to this configuration, it is possible to effectively carry out determining the acceptability of the article A based on its weight W, in a production line.

Further, in this embodiment, the controller 102 acquires the total weight $W_S$ of the plurality of articles A held by the end effector 16 (step S23), and calculates the weight $W_n$ of the $n_{th}$ article $A_n$ by subtracting from the total weight $W_S$ the sum weight $W_{S-1}$ of the articles $A_1$ to $A_{n-1}$ calculated in steps S20 and S24 executed prior to the acquisition of the total weight $W_S$ (step S24). According to this configuration, it is possible to speedily and precisely measure the respective weights $W_1$ to $W_n$ of the plurality of articles $A_1$ to $A_n$ held by the end effector 16 with a relatively simple algorithm.

Further, in this embodiment, the controller 102 measures the weight W of the article A (step S18) when the predetermined time $t_R$ has elapsed after the motion of the $n_{th}$ hand movement mechanism (56 or 58) is completed in step S15 (i.e., when it is determined YES in step S17). According to this configuration, since the weight W of the article A can be measured when the $n_{th}$ hand is in a completely static state after the execution of step S15, it is possible to measure the weight W more precisely.

Further, in this embodiment, each of the first hand movement mechanism 56 and the second hand movement mechanism 58 is an air cylinder. According to this configuration, since the weights of the first hand movement mechanism 56 and the second hand movement mechanism 58 can be reduced, it is possible to reduce the inertia of the end effector 16.

Further, in this embodiment, the controller 102 transports the articles A having weights out of the allowance range to the defective product storage (step S22), while transporting the articles A having weights within the allowance range to the acceptable product storage (step S6). According to this configuration, it is possible to sort the articles A into the acceptable articles and the defective articles, and stores them in the separate places.

Figure 7:
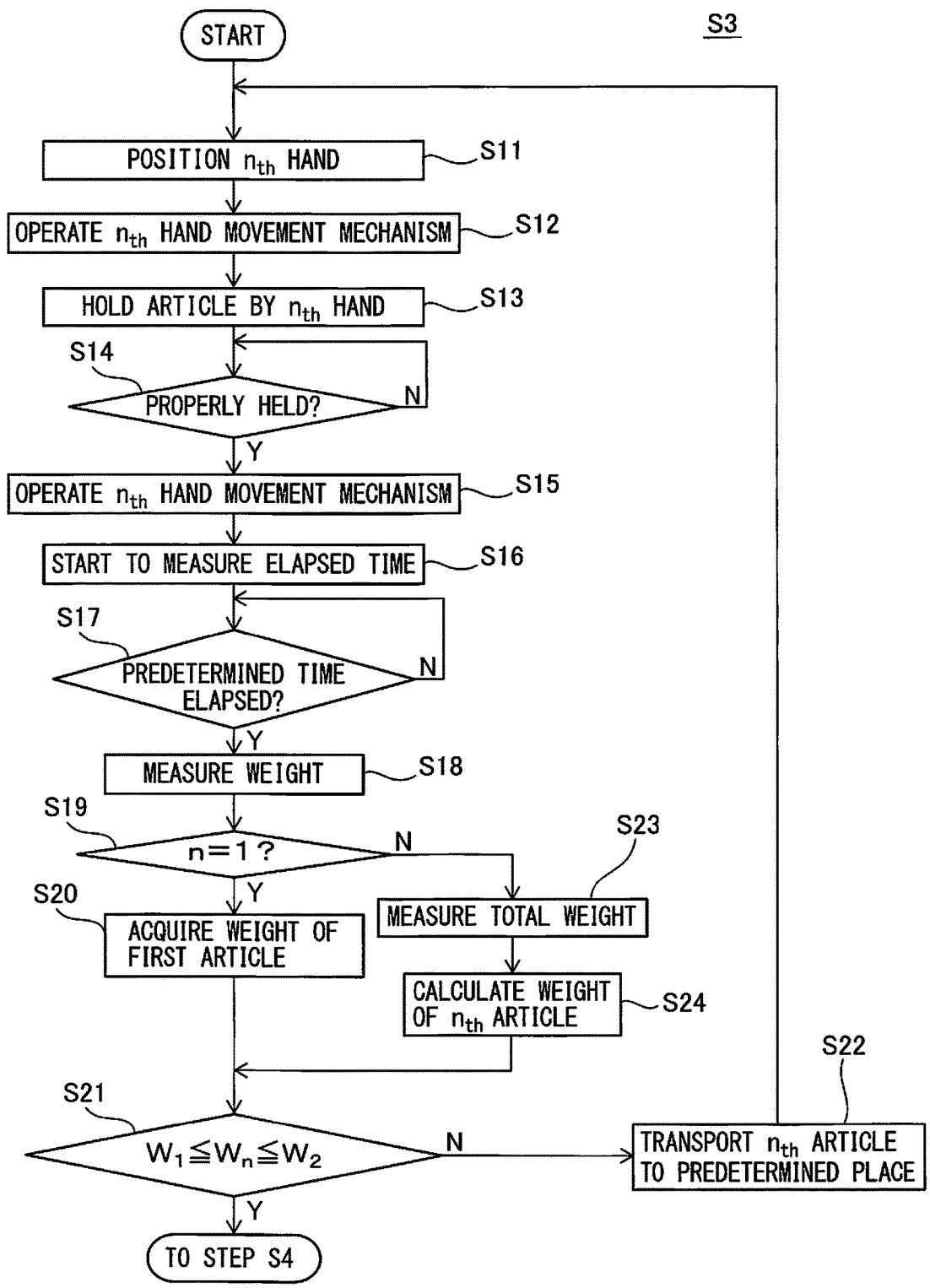
FIG. 7 is a flow chart illustrating an example of the process in step S3 in FIG. 6.

Note that, if the end effector 16 includes a total of "n" hands ("n" is an integer greater than 2) and a total of "n" hand movement mechanisms, the controller 102 can also successively hold the articles $A_1$ to $A_n$ with the end effector 16 and measure the respective weights $W_1$ to $W_n$ of the articles $A_1$ to $A_n$, by carrying out the flows illustrated in FIGS. 6 and 7.

Further, in the above-described embodiments, the hands 52 and 54 include the negative-pressure generation devices 62 and 68. However, the hand 52 or 54 may include a hollow member, instead of the negative-pressure generation device 62 or 68.

In this case, the hollow member is connected to an air suction device provided outside of the weight measurement system 100, wherein the air suction device may generate a negative pressure in the suction section 64 or 70 by decreasing an air pressure in the hollow member.

The first hand 52 or 54 may include e.g. an electromagnet, a sucker, or an adhesive material, instead of the negative-pressure generation device 62 or 68 and the suction section 64 or 70, and hold the article A by such an element. Alternatively, the first hand 52 or 54 may include a plurality of openable and closable fingers, and hold the article A with the fingers.

In the above-described embodiments, the hand movement mechanism 56, 58 is an air cylinder. However, the hand movement mechanism 56, 58 may be e.g. a servo motor or linear motor, or may be any other device capable of moving the hand 52, 54.

In the above-described embodiments, the robot 12 is a parallel link robot. However, the robot 12 may be e.g. a vertical articulated robot. In this case, the proximal end 14b of the weight measurement device 14 may be provided at a distal end of a wrist of the vertical articulated robot. Alternatively, the robot 12 may be a robot such as a loader.

The present disclosure has been described above with embodiments but the above-described embodiments do not limit the invention according to the claims.

The invention claimed is:

1. A weight measurement system comprising:
   a robot arm;
   a weight measurement device attached to the robot arm;
   a plurality of hand movement mechanisms attached to the weight measurement device; and
   a plurality of hands respectively moved by respective motions of the plurality of hand movement mechanisms,
   wherein, when a second hand of the plurality of hands moved by the motion of a second hand movement mechanism of the plurality of hand movement mechanisms holds a second article while a first hand of the plurality of hands moved by the motion of a first hand movement mechanism of the plurality of hand movement mechanisms is holding a first article, the weight measurement device is configured to measure a total weight of the first article and the second article,
   wherein the weight measurement system is configured to measure a weight of the first article and a weight of a second article, respectively, based on the total weight.

2. The weight measurement system according to claim 1, wherein the weight measurement device is configured to measure the weight of the first article, and subsequently measure the total weight, wherein the weight measurement system is configured to measure the weight of the second article by subtracting the weight of the first article from the total weight.

3. The weight measurement system according to claim 1, wherein the weight measurement device is configured to:

measure the weight of the first article after a predetermined time elapses from a time point when the motion of the first hand movement mechanism is ended; and measure the weight of the second article after a predetermined time elapses from a time point when the motion of the second hand movement mechanism is ended.

4. The weight measurement system according to claim 1, wherein the first hand movement mechanism includes a first air cylinder, and the second hand movement mechanism includes a second air cylinder.

5. The weight measurement system according to claim 1, wherein each of the first hand and the second hand includes a suction surface configured to suck an article.

6. A method of measuring a weight of an article by the weight measurement system according to claim 1, the method comprising:

operating the first hand movement mechanism to hold the first article by the first hand;

operating the second hand movement mechanism to hold the second article by the second hand while the first hand is holding the first article;

measuring a total weight of the first article and the second article; and measuring a weight of the first article and a weight of the second article, respectively, based on the total weight.

7. The weight measurement system according to claim 1, wherein the weight measurement device is configured to measure the total weight, and subsequently measure the weight of the first article, wherein the weight measurement system is configured to measure the weight of the second article by subtracting the weight of the first article from the total weight.

\* \* \* \* \*